No. 892,799. PATENTED JULY 7, 1908.
H. BEYREIS.
ATTACHMENT FOR CUTTER BARS OF MOWERS AND HARVESTERS.
APPLICATION FILED APR. 30, 1907.
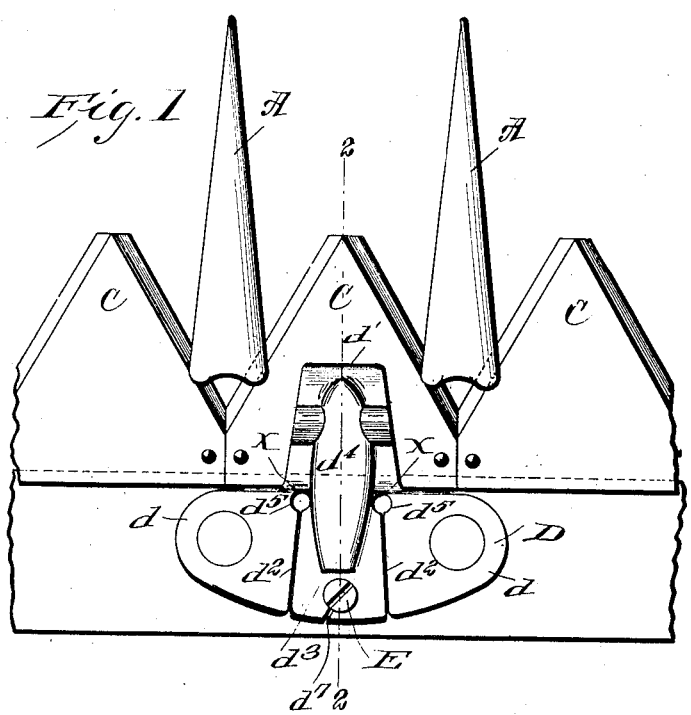
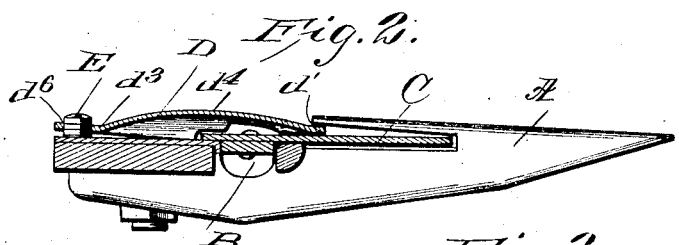
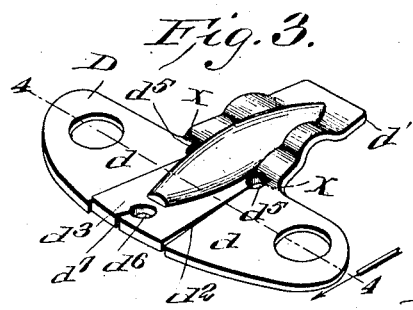
WITNESSES
INVENTOR
HENRY BEYREIS
BY
ATTORNEYS

UNITED STATES PATENT OFFICE.

HENRY BEYREIS, OF SENECA, KANSAS.

ATTACHMENT FOR CUTTER-BARS OF MOWERS AND HARVESTERS.

No. 892,799.     Specification of Letters Patent.     Patented July 7, 1908.

Application filed April 30, 1907. Serial No. 371,072.

*To all whom it may concern:*

Be it known that I, HENRY BEYREIS, a citizen of the United States, and a resident of Seneca, in the county of Nemaha and State of Kansas, have invented an Improved Attachment for Cutter-Bars of Mowers and Harvesters, of which the following is a specification.

Reciprocating cutter-bars of mowers and grain harvesters are provided with devices ordinarily termed "clips", for pressing upon the knives or cutters proper and thereby holding them down on the guard plates or fingers as required for effective cutting action. It has been customary to knock down the toes or bearing points of such clips with a hammer, when required to take up wear or cause them to press more firmly on the knives. This method is attended by undesirable results, in that it is difficult to obtain the exact depression required for the toes of the clips, and ordinarily the pressure is excessive so that the knives slide with too great friction and consequently wear too much; besides, the removal and substitution of the knives is rendered difficult.

I have devised a simple improvement in the construction of the clips by which these difficulties and objections are overcome.

The details of construction, arrangement, and combination of parts are as hereinafter described, and illustrated in the accompanying drawing, in which Figure 1 is a plan view of a portion of the finger-bar and cutter-bar of a mower or harvester provided with my improved attachment. Fig. 2 is a transverse section on the line 2—2 of Fig. 1. Fig. 3 is a perspective view of my improved clip. Fig. 4 is a section of the clip on the line 4—4 of Fig. 3.

A indicates the finger-bar, and B, the cutter-bar of a mower or harvester, which parts may be constructed and arranged in the usual manner. The cutter-bar B is provided as usual with a series of triangular knives, or cutters C. My improved clip D is essentially T-shaped, as usual heretofore, the same comprising a flat body portion $d$ which is secured by bolts or rivets to the finger-bar proper, and a projecting portion or toe $d'$ which constitutes a bearing point, it being slightly arched adjacent to the body $d$ with which it is formed integral. Two slots $d^2$ are formed transversely in the body $d$, thus forming a tongue $d^3$ which constitutes practically the rear extension of the bearing point $d'$. For the sake of strength and rigidity, the parts $d'$ $d^3$ are provided with a swell $d^4$ on the upper side thereof.

The clip as a whole is made of flexible, or spring, material, and the connection of the bearing portion $d'$ with the body $d$ at $x$ is narrow so that there is a considerable degree of flexibility at that point. Said points $x$ constitute in fact hinges or fulcra upon which the parts $d'$ and $d^3$ turn. In order to prevent the metal cracking or breaking at these points I punch or bore holes $d^5$, and the same also serve as oil holes. The rear end of the tongue $d^3$, which practically constitutes a lever for the toe portion $d'$, is provided with a threaded hole $d^6$ for receiving a screw E; see Figs. 1–2. The same is shown as cylindrical in form and provided with a nick for reception of a screw-driver. The screw sets directly upon the rear portion of the finger-bar A. It will now be understood that, by rotating the screw in one direction or the other, the lever $d^3$ may be raised or lowered and consequently the toes $d'$ may be caused to press more or less upon the knives C. In other words, if the screw be rotated so as to raise the lever $d^3$, the toe $d'$ will be depressed correspondingly, and thus press more firmly upon the knives. On the other hand, when the screw is rotated in the opposite direction, the lever $d^3$ is lowered so that the pressure of the toe $d'$ on the knives is correspondingly loosened. Thus the pressure of the clip on the knives may be adjusted to a nicety.

When the screw has been adjusted to allow the lever $d^3$ to lie flat upon the guard plate, the toe having a considerable degree of elasticity, may rise or spring upward sufficiently to allow a knife to be removed or inserted with ease.

The rear end of lever or tongue $d^3$ is slotted at $d^7$, the slot leading into the screw hole $d^6$. By this means, if the screw E becomes loose in the said hole it may be tightened by upsetting or driving inward the metal on either side of the slot $d^7$.

I claim—

The improved clip for the purpose specified, comprising a body portion, a lateral extension or toe for bearing upon a knife, the rear extension of the toe intervening and being separated from the end portions of the body, the whole being formed integral and of spring material, substantially as described.

HENRY BEYREIS.

Witnesses:
A. H. PELTON,
R. F. SCOTT.